United States Patent [19]

Ma

[11] 4,388,059

[45] Jun. 14, 1983

[54] AUTOMATIC EGG ROLL MAKING MACHINE

[76] Inventor: Kwok C. Ma, 144 Hester St., New York, N.Y. 10013

[21] Appl. No.: 325,792

[22] Filed: Nov. 30, 1981

[51] Int. Cl.³ .......................... B29D 3/00; A23P 1/00
[52] U.S. Cl. ................................ 425/112; 99/450.6; 425/113; 425/117; 425/125; 425/126 R; 425/127; 425/296; 425/297; 425/391; 425/301; 425/305.1; 425/308; 425/324.1
[58] Field of Search ................... 99/450.6; 425/90, 95, 425/96, 99, 112, 113, 126 R, 127, 148, 289, 297, 301, 308, 305.1, 324.1, 391, 371, 296, 117, 125, 259, 261

[56] References Cited

U.S. PATENT DOCUMENTS

| | | | |
|---|---|---|---|
| 2,747,521 | 5/1956 | Gardner | 99/450.6 |
| 2,855,867 | 10/1958 | Zeitlin | 99/450.6 |
| 3,450,067 | 6/1969 | Kao | 425/305.1 |
| 3,494,303 | 2/1970 | Shiffer | 425/113 |
| 3,611,950 | 10/1971 | Battaglia | 99/405.6 |
| 3,633,517 | 1/1972 | Kao | 99/450.6 |
| 3,669,007 | 6/1972 | Pulici | 99/450.6 |
| 3,912,433 | 10/1975 | Ma | 99/450.6 |
| 4,014,254 | 3/1977 | Ohkawa | 99/450.6 |
| 4,084,493 | 4/1978 | Quintana | 99/450.6 |
| 4,160,634 | 7/1979 | Huang | 99/450.6 |
| 4,233,018 | 11/1980 | Chinfen | 425/297 |
| 4,321,858 | 3/1982 | Williams | 99/450.6 |

*Primary Examiner*—Willard E. Hoag
*Attorney, Agent, or Firm*—Jordan & Hamburg

[57] ABSTRACT

An apparatus for automatically making egg rolls comprises an intermittently moving transmitting device and a plurality of forming assemblies on the transmitting device. Each forming assembly includes folding devices for folding three side portions of an egg roll dough and a mold device for receiving a part of the egg roll dough and an egg roll stuffing therein. The apparatus further comprises a device for feeding the egg roll dough successively on each forming assembly, a device for supplying the egg roll stuffing on the egg roll dough, a device for actuating the folding means of the forming assembly to fold three side portions of the egg roll dough over the stuffing in the mold device to thereby form a partially folded egg roll, and a device for wrapping the partially folded egg roll to form a cylindrical egg roll product. In the supplying device, the necessary amount of the stuffing to be disposed in one egg roll product is prepared, and the stuffing is put into the mold device to deposit the stuffing and a part of the egg roll dough therein. In the wrapping device, the stuffing portion in the mold device is pushed up therefrom and is turned for wrapping the remaining side portion of the egg roll dough. Thereafter, the wrapped product is transferred.

13 Claims, 40 Drawing Figures

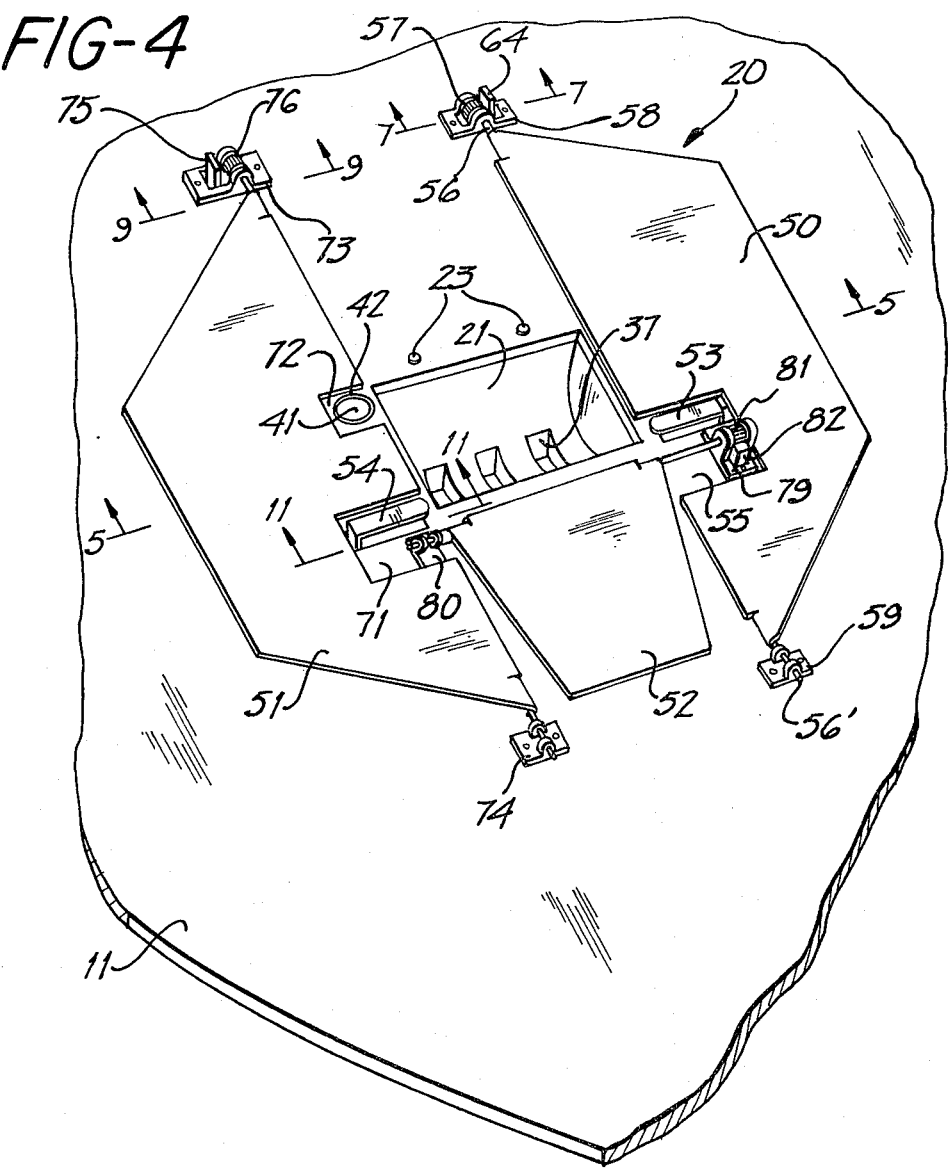

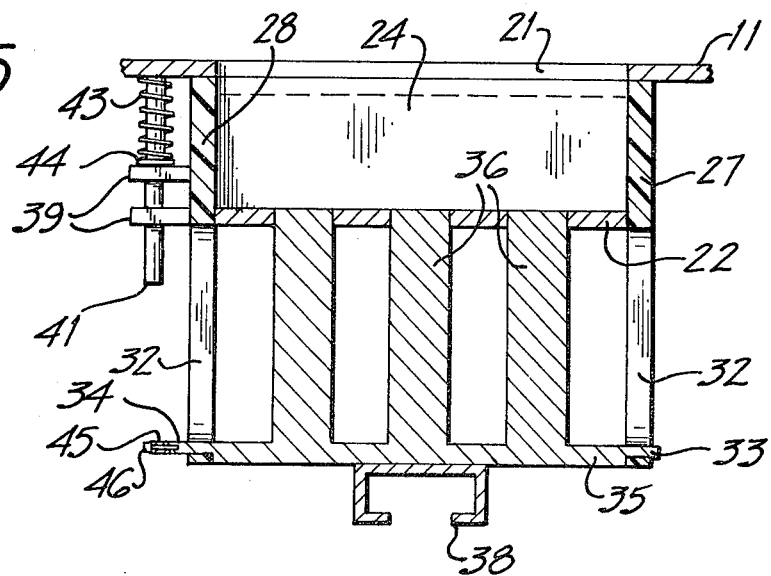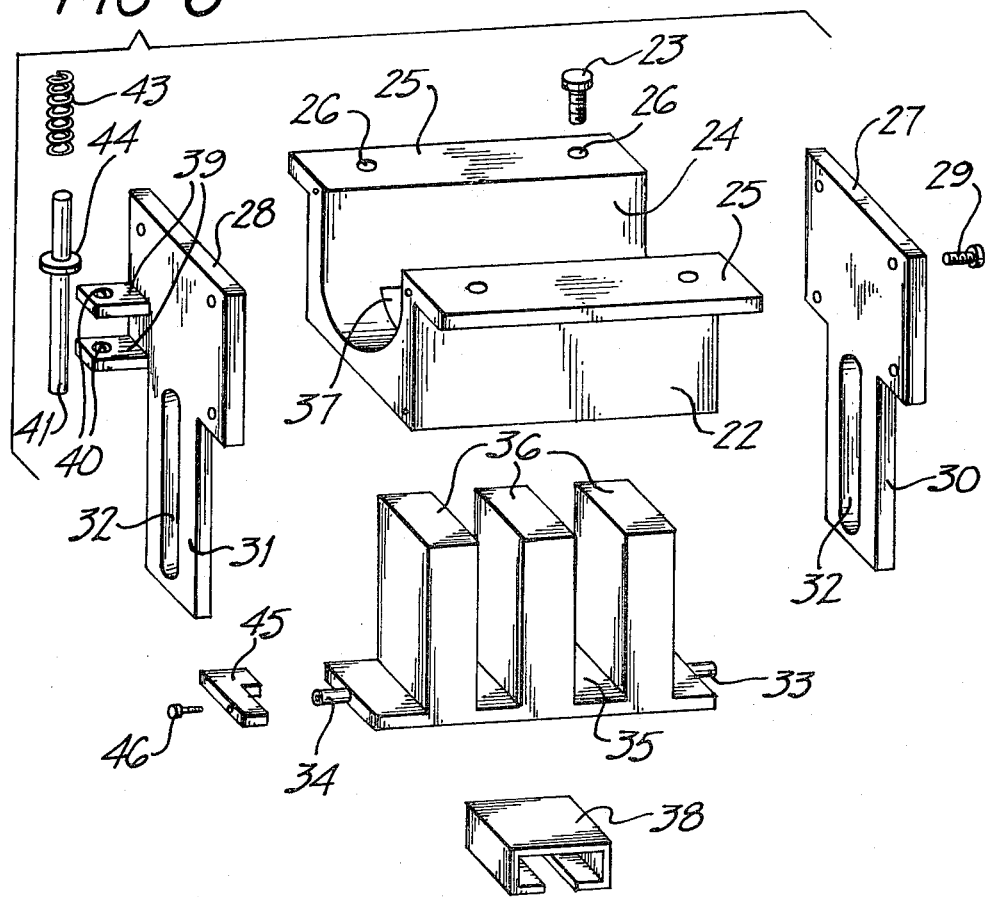

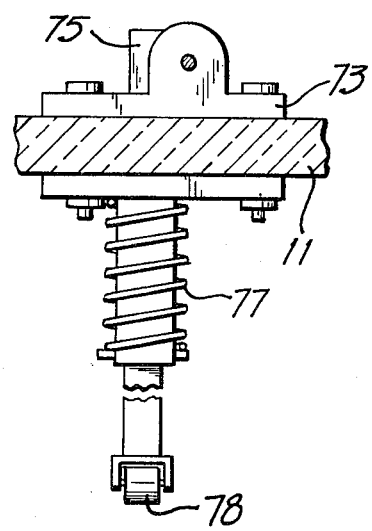
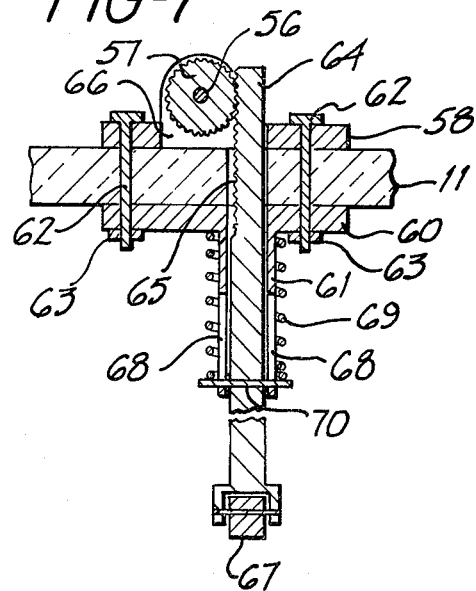
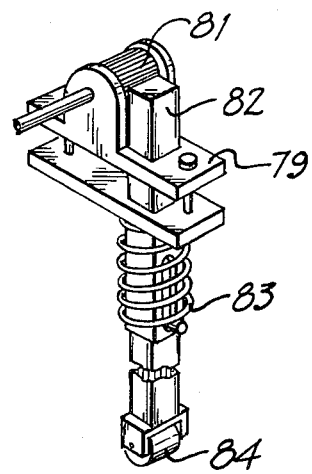
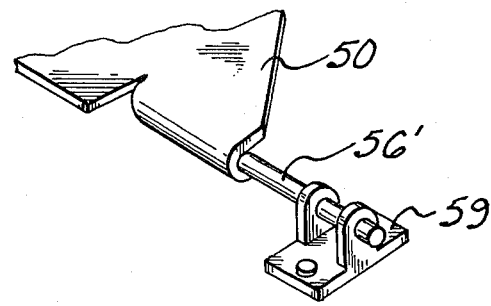
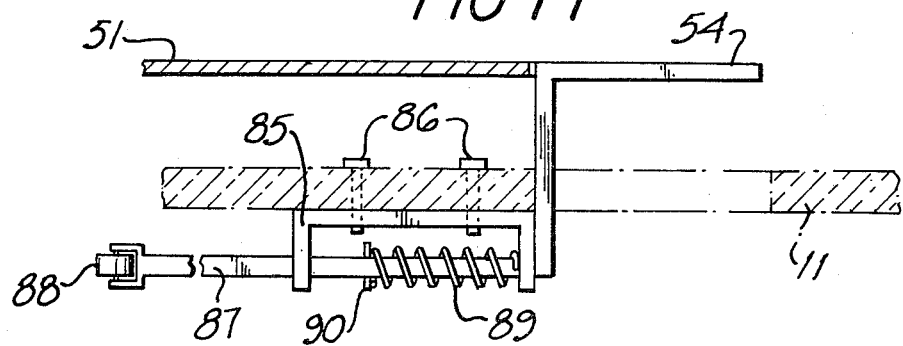

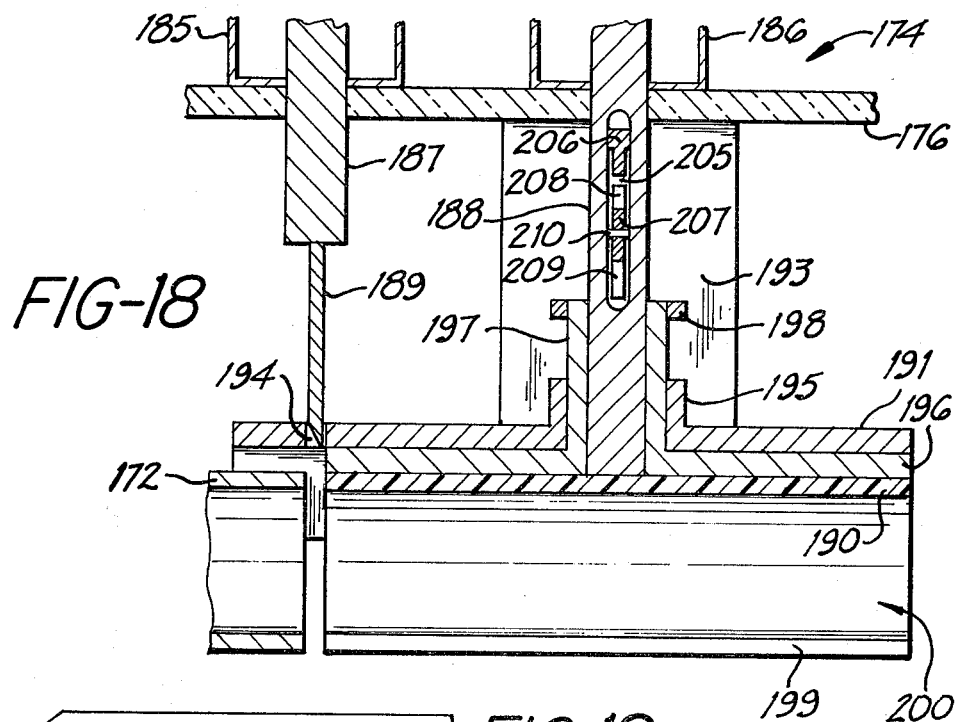
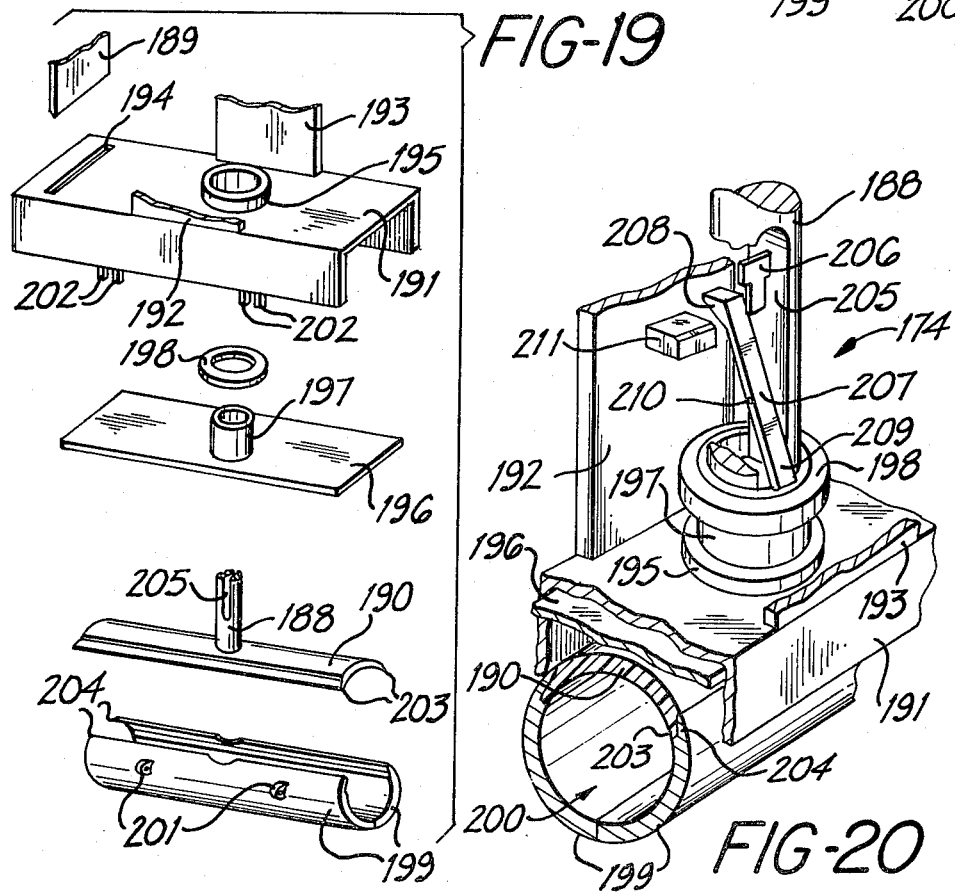

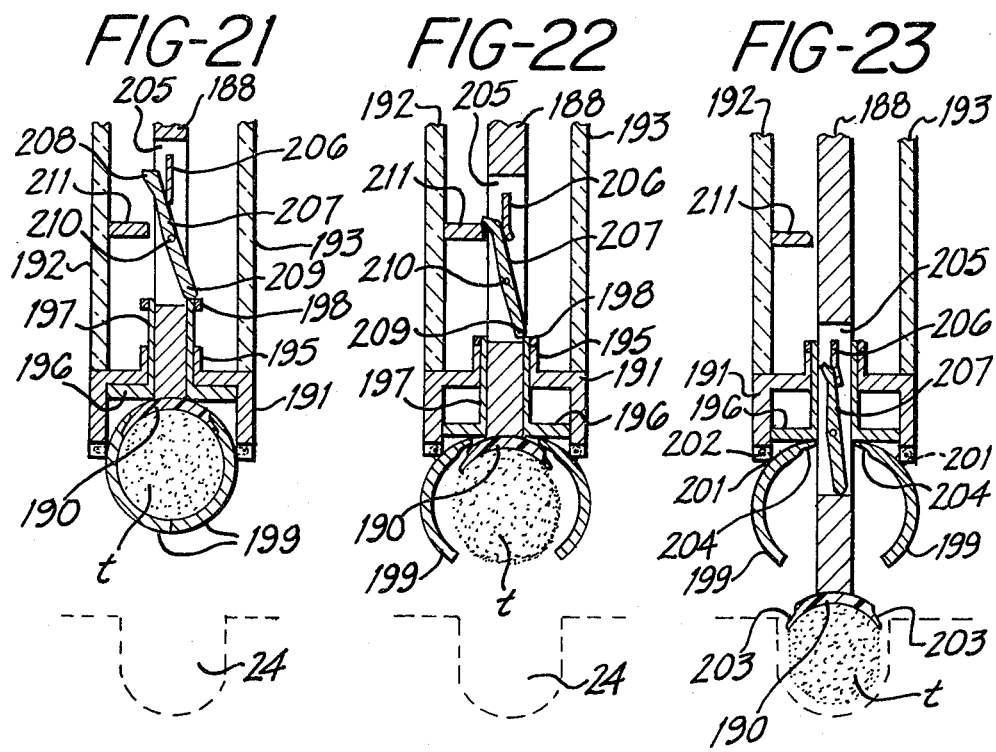
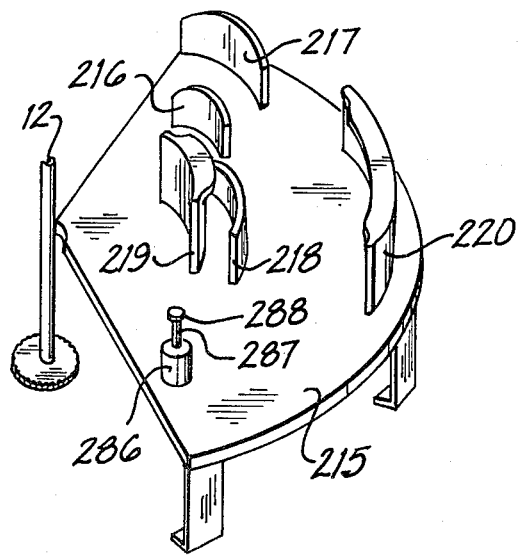
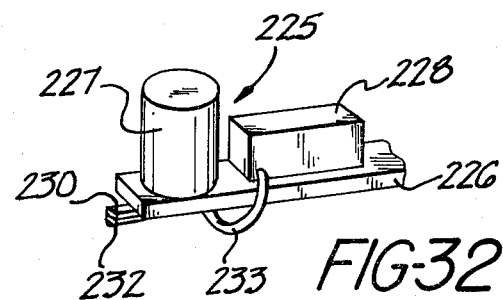
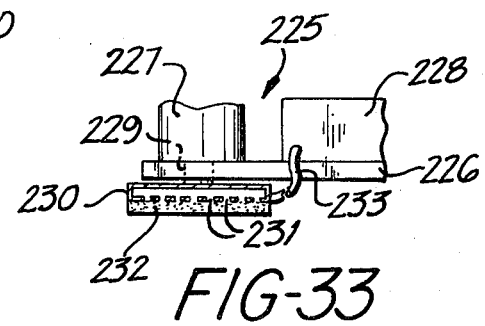

AUTOMATIC EGG ROLL MAKING MACHINE

BACKGROUND OF THE INVENTION

This invention relates to an automatic egg roll making machine and more particularly to an automatic apparatus for continuously providing egg roll dough, putting food stuffing in the dough and wrapping the stuffing within the dough.

In the past, egg rolls were made by hand one by one because the egg roll dough is so soft that it is very difficult to mechanically wrap the dough in the proper shape. If the egg roll dough is strongly pulled or turned for tight wrapping, the dough is easily torn off. To the contrary, if the dough is loosely wrapped, the egg roll can not be kept in a cylindrical form commonly regarded as the egg roll. However, attempts have been made to provide automatical egg roll making machines. In this regard, U.S. Pat. Nos. 3,633,517, 3,912,433, 3,450,067, 3,494,303 and 2,437,202 which relate to egg roll making machines or food processing systems are examples of prior arrangements.

Accordingly, an object of the invention is to provide an automatic egg roll making machine, in which the egg rolls are tightly wrapped into cylindrical shapes and are continuously made.

Another object of the invention is to provide an automatic egg roll making machine as stated above, which is relatively compact and works reliably.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

SUMMARY OF THE INVENTION

In accordance with the invention, an automatic egg roll making machine is provided, which comprises intermittently moving transmitting means, and a plurality of forming assemblies on the transmitting means, each forming assembly including folding means for folding three side portions of an egg roll dough and mold means for receiving a part of the egg roll dough and an egg roll stuffing therein. The egg roll making machine further comprises means for feeding the egg roll dough successively on each forming assembly, means for supplying the egg roll stuffing on the egg roll dough, means for actuating the folding means to fold three side portions of the egg roll dough over the stuffing in the mold means to thereby form a partially folded egg roll, and means for wrapping the partially folded egg roll to form a final egg roll product. The supplying means prepares the necessary amount of the stuffing to be disposed in one egg roll product and urges the stuffing into the mold means to deposit the stuffing and a part of the egg roll dough therein. The wrapping means operates to push up the stuffing portion in the mold means therefrom and to turn the stuffing portion for wrapping the remaining egg roll dough and transferring the wrapped product.

The feeding means of the egg roll dough comprises a dough feeder for withdrawing a roll type of the elongated egg roll dough at a predetermined length, and a dough cutter for cutting the elongated dough to form a rectangular sheet of the egg roll dough. The feeding means further comprises a reciprocally moving support plate to easily locate the elongated dough onto the forming assembly, and a disposing member to retain the dough on the forming assembly when the support plate returns to a retracted position. Consequently, the soft egg roll dough can be put on the forming assembly.

The supplying means of the egg roll stuffing comprises a hopper containing the egg roll stuffing therein, a food injector having a screw conveyor, and a distributing member to place the food stuffing supplied from the hopper by means of the screw conveyor onto the egg roll dough. The distributing member includes a collapsible compartment located in front of the food injector, a stuffing cutter to cut the stuffing along a rear end of the compartment, and an arranging member to collapse the compartment and put the stuffing in the compartment onto the egg roll dough.

The transmitting means includes a plurality of openings, while the mold means includes a body and a pushing block connected to the body. The body is attached beneath the opening of the transmitting means and is provided with a depression to receive therein a part of the egg roll dough and the egg roll stuffing through the opening. The pushing block is operated by the wrapping means to thereby lift the stuffing portion in the depression onto the transmitting means.

The folding means of the forming assembly comprises inner, middle and outer folding plates rotationally situated on the transmitting means to surround the opening at three sides, and operation members for each folding plate. Each operation member includes a gear attached to an axis of the folding plate and a rack engaging the gear, so that when the rack is moved up and down, the folding plate rotates relative to the axis. Consequently, the dough on the folding plate is folded along the axis.

The folding means further comprises a pair of holding members attached perpendicular to the inner and outer folding plates. Each holding member includes a hook to be located on an inner or outer edge of the folded egg roll dough. After the inner and outer portions of the egg roll dough are folded by the inner and outer folding plates, the hooks are moved onto the inner and outer edges so that the rear portion of the egg roll dough is properly folded by the middle folding plate.

The actuating means of the folding means comprises three vertical cam members for moving the respective racks up and down to actuate the folding plates independently, and two horizontal cam members for moving the hooks of the holding members toward the opening of the transmitting means. The vertical and horizontal cam members are immovably situated below the transmitting means.

The wrapping means comprises a lifting member to move the pushing block of the mold means up and down, a conveyor, and a bottom plate below the conveyor. When the pushing block is lifted up by the lifting member, an upper end of the stuffing portion of the egg roll is contacted with the conveyor and the unfolded egg roll dough is located below the bottom plate. When the stuffing portion is rotated, the unfolded egg roll dough is held below the bottom plate to apply tension thereto so that the stuffing portion can be tightly wrapped. After wrapping, the egg roll product is transferred by the conveyor.

BRIEF DESCRIPTION OF THE DRAWINGS

FIG. 4 is a perspective view of one of forming assemblies located on a turntable of the egg roll making machine;

FIG. 5 is a cross section view of a mold assembly taken along line 5—5 in FIG. 4;

FIG. 6 is an exploded view of the mold assembly shown in FIG. 5;

FIG. 7 is a cross section view of an operation mechanism of an inner folding plate taken along line 7—7 in FIG. 4;

FIG. 8 is an enlarged perspective view of a pedestal of the inner folding plate on an opposite side of the operational mechanism;

FIG. 9 is a cross section view of an operation mechanism of an outer folding plate taken along line 9—9 in FIG. 4;

FIG. 10 is a perspective view of an operation mechanism of a middle folding plate;

FIG. 11 is a cross section view of a holding member of the forming assembly taken along line 11—11 in FIG. 4;

FIG. 12 is a perspective view of the holding member shown in FIG. 11;

FIG. 18 is an enlarged section view of a distributing member of the egg roll stuffing supplier taken along line 18—18 in FIG. 17;

FIG. 19 is an exploded view of a part of the distributing member shown in FIG. 18;

FIG. 20 is an explanatory perspective view of the distributing member to show an arranging member thereof;

FIGS. 21-23 are sectional views of the distributing member to show movement of the member for placing the food stuffing;

FIG. 24 is a perspective view of actuating means of the folding plates to fold the egg roll dough step by step;

FIG. 32 is a perspective view of a moisturizer to moisturize the egg roll dough when folding;

FIG. 33 is a side view of the moisturizer as shown in FIG. 32, in which a part of the moisturizer is cut in section;

PREFERRED EMBODIMENTS OF THE INVENTION

Figure 1:
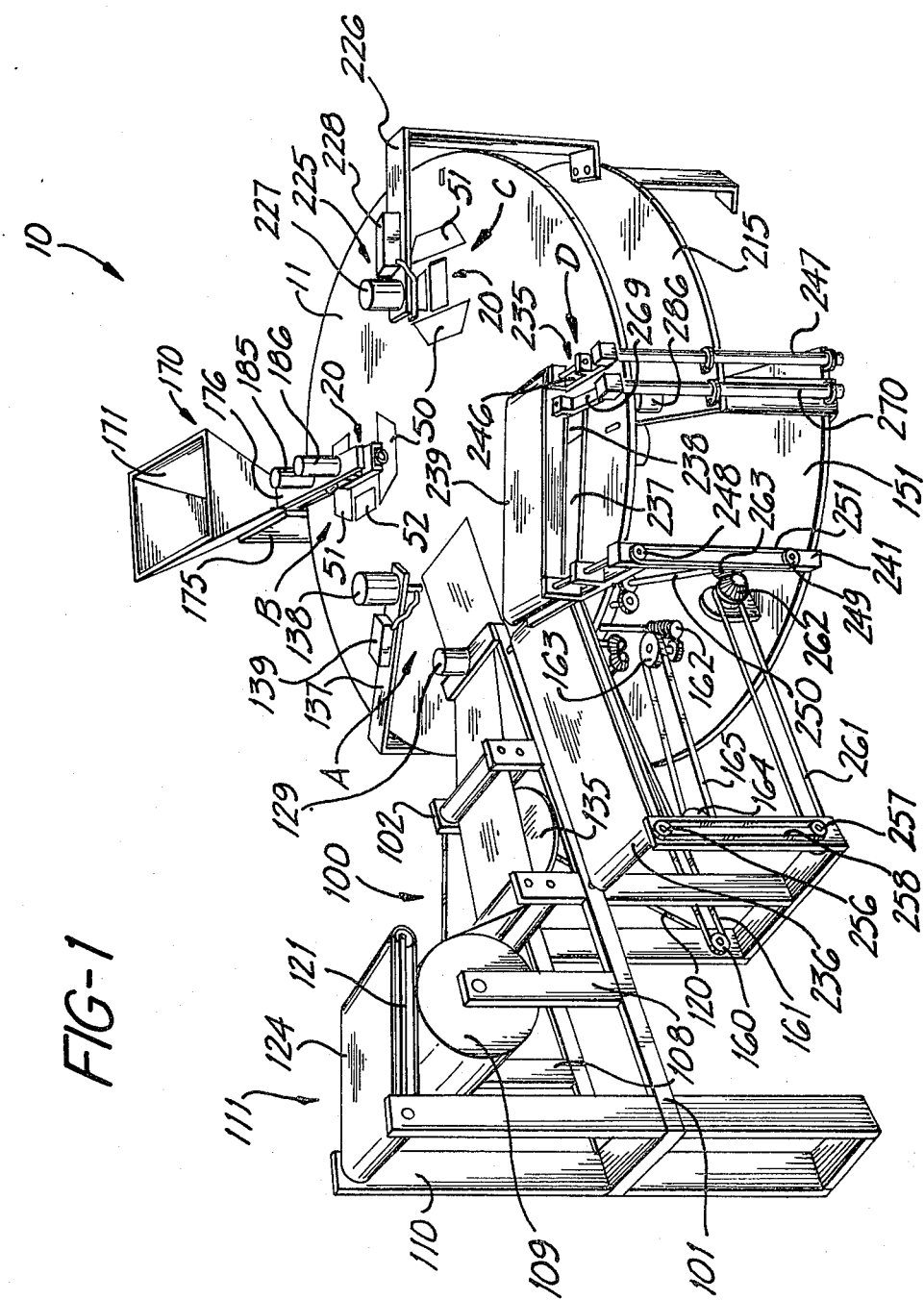
FIG. 1 is a perspective view of the egg roll making machine in accordance with the present invention.
Figure 2:
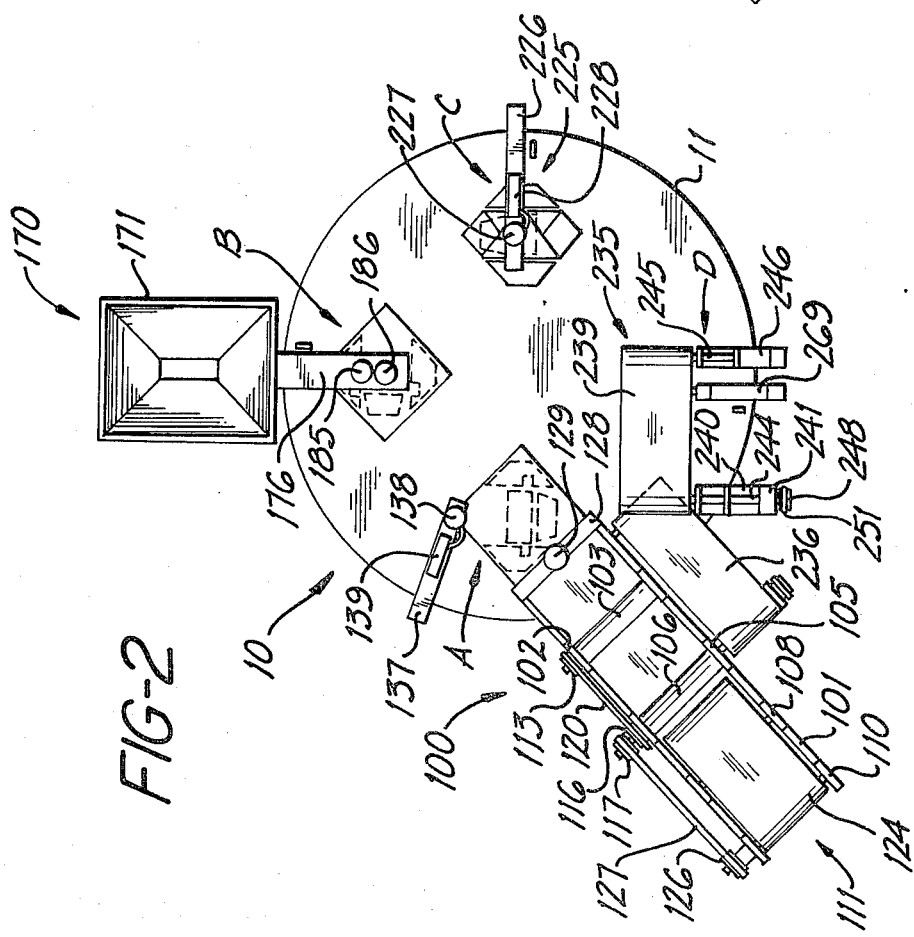
FIG. 2 is a plan view of the egg roll making machine.

Referring to FIGS. 1 and 2, there is shown an egg roll making machine 10 in accordance with the present invention. The egg roll making machine 10 is provided with a turntable 11 which is intermittently rotated to make egg rolls step-by-step. Namely, the turntable 11 is stopped at four stations located every 90 degrees. At station A, an egg roll dough s is supplied onto the turntable 11 and an egg roll stuffing t is put on the dough s at station B. After passing station B, the dough s is gradually folded. At station C, liquid is applied to the partially folded egg roll dough s, and the dough s is finally wrapped at station D.

The turntable 11 is provided with a vertical shaft 12 (FIG. 3) which is connected to a gear 13. The gear 13 is engaged with a motor 14 by means of gears 15, 16, so that when the motor 14 is operated, the turntable 11 rotates. As stated above, the motor 14 is intermittently operated to stop the turntable 11 every 90 degrees, i.e. at stations A, B, C and D.

On the turntable 11, there are provided four forming assemblies 20 which are stopped in turn at stations A, B, C and D in accordance with rotation of the turntable 11. FIG. 4 shows one of the assemblies 20 located at station A.

As shown in FIG. 4, an opening 21 is situated in the middle of the assembly 20, the opening 21 passing through the turntable 11. Behind the opening 21, a mold 22 is connected to the turntable 11 by means of bolts 23. The mold 22 includes a depression 24 to which the egg roll stuffing t is disposed through the opening 21, and flanges 25 have holes 26 (see FIGS. 5 and 6). The bolts 23 engage the holes 26 of the flanges 25 for connection of the mold 22 to the turntable 11.

Side plates 27, 28 are attached to the mold 22 by means of bolts 29 to define side faces of the depression 24. The side plates 27, 28 include guide projections 30, 31 extending downwardly therefrom, each projection having a vertical guide hole 32 therein. The guide hole 32 receives guide bars 33, 34 of a pushing block 35 to support and guide the pushing block 35. The pushing block 35 is provided with three pushing heads 36 extending upwardly therefrom, which are located in respective rectangular holes 37 formed in a bottom of the mold 22. When the pushing block 35 is located in a bottom position, the pushing heads 36 are positioned in the holes 37 below the depression 24. However, when the pushing block 35 is moved to an uppermost position, the pushing heads 36 pass through the rectangular holes 37 and the opening 21, and top ends of the heads 36 reach above the turntable 11.

The pushing block 35 is provided with a guide 38 beneath the block 35 which receives an upper end of a piston rod to lift up the pushing block 35 at station D. The mechanism and operation thereof will be explained further in detail later.

The side plate 28 includes two support plates 39 having holes 40 respectively into which a rod 41 is slidably inserted. The turntable 11 is provided with a hole 42 (FIG. 4) in which a top end of the rod 41 is situated. A spring 43 is disposed around the rod 41, a lower end of the spring 43 being located on a flange 44 of the rod 41 and an upper end thereof being contacted with the bottom face of the turntable 11 to urge the rod 41 downwardly. A plate 45 is connected to the guide bar 34 of the pushing block 35 by means of a screw 46 so that the plate 45 can be moved together with the pushing block 35. Accordingly, when the pushing block 35 is moved to the uppermost position, the plate 45 is in the middle of its movement contacted with the lower end of the rod 41, and then the rod 41 is also moved upwardly. When the pushing block 35 is lowered down, the rod 41 is also moved downwardly by the spring 43. The function of the pushing rod 41 will be further explained later.

Referring again to FIG. 4, the forming assembly 20 includes an inner folding plate 50, an outer folding plate 51 and a middle folding plate 52, which are rotationally connected on the turntable 11 to surround the opening 21. Also, hooks 53, 54 are connected to the turntable 11 to move toward the opening 21. The folding plates 50, 51 operate to fold inner and outer side portions of the egg roll dough, and the hooks 53, 54 operate to hold the folded inner and outer side edges of the egg roll dough s when a rear portion of the egg roll dough s is folded by the middle plate 52.

The inner plate 50 is formed into a trapezoid shape and includes a notch 55 for receiving the hook 53 and an operation mechanism of the middle plate 52. Inner ends of the plate 50 are bent to connect rotational shafts 56, 56' to the plate 50. The shaft 56 is provided with a gear 57 as a part of the operation mechanism and is situated on a pedestal 58 as shown in FIG. 7, while the shaft 56' is disposed on a pedestal 59 connected to the turntable 11 as shown in FIG. 8. On the opposite side of the pedestal 58 relative to the turntable 11, a base 60 having a rectangular member 61 is located, the pedestal 58 and the base 60 being connected together by means of bolts 62 and nuts 63. A rack 64 is situated within the rectangular member 61, an upper end of the rack 64 passing through an opening 65 of the turntable 11 and an opening 66 of the pedestal 58 to engage the gear 57 of the shaft 56, and a lower end of the rack 64 being connected to a roller 67. The rectangular member 61 includes two elongated slots 68, and a spring 69 is situated outside the member 61. A pin 70 is attached to the rack 64 to extend outwardly through the elongated slots 68 of the rectangular member 61. An end of the spring 69 is located on the pin 70 so that the rack 64 is always urged downwardly.

When the rack 64 is located in the lower position as shown in FIG. 7, the inner plate 50 is in a open position, namely parallel to the turntable 11. When the rack 64 is moved upwardly, the gear 57 is rotated to thereby rotate the inner plate 50 onto the opening 21 to fold the egg roll dough s inwardly. Actuation of the inner plate 50 will be further explained later.

The outer plate 51 has a trapezoid shape the same as the inner plate 50, but the plate 51 includes two notches 71, 72, the notch 71 receiving the hook 54 and a pedestal of the middle plate 52, and the notch 72 serving as a path of the rod 41 when moving upwardly.

The outer plate 51 is rotationally situated on pedestals 73, 74, which are the same as the pedestals 58, 59 of the inner plate 50. However, the pedestal 73 is located symmetrically relative to the pedestal 58 as shown in FIG. 9, namely the rack 75 is engaged with a gear 76 on its left side. As an operation mechanism of the outer plate 51, a spring 77 and a roller 78 are provided the same as those of the inner plate 50 shown in FIG. 7. Therefore, detailed structure and operation of the mechanism are not set forth.

The middle plate 52 is also rotationally situated on pedestals 79, 80 which are located in the notch 55 of the inner plate 50 and in the notch 71 of the outer plate 51 respectively. As an operation mechanism of the middle plate 52, there are provided a gear 81, a rack 82, a spring 83 and a roller 84 as shown in FIG. 10. Other structures of the operation mechanism of the middle plate 52 are exactly the same as those of the inner and outer operation mechanisms.

As previously stated, the hooks 53, 54 are symmetrically situated relative to the opening 21 of the turntable 11. The hooks 53, 54 are exactly the same, so that only an explanation of the hook 54 is set forth as shown in FIGS. 11 and 12.

The hook 54 is supported by a hook frame 85 connected beneath the turntable 11 by means of screws 86. Namely, a rectangular rod 87 is movably situated in the hook frame 85 to an inner end of which the hook 54 is connected. The rod 87 includes a roller 88 at an outer end, and a spring 89 therearound. A pin 90 is inserted into the rod 86 as a stopper of the spring 89 so that the hook 54 is always urged rearwardly. When the rod 87 is moved forwardly (toward the opening 21), the hook 54 moves to hold the edge of the egg roll dough.

Operation of the folding plates 50, 51, 52 and the hooks 53, 54 will be explained further in detail later in the specification.

Figure 13:
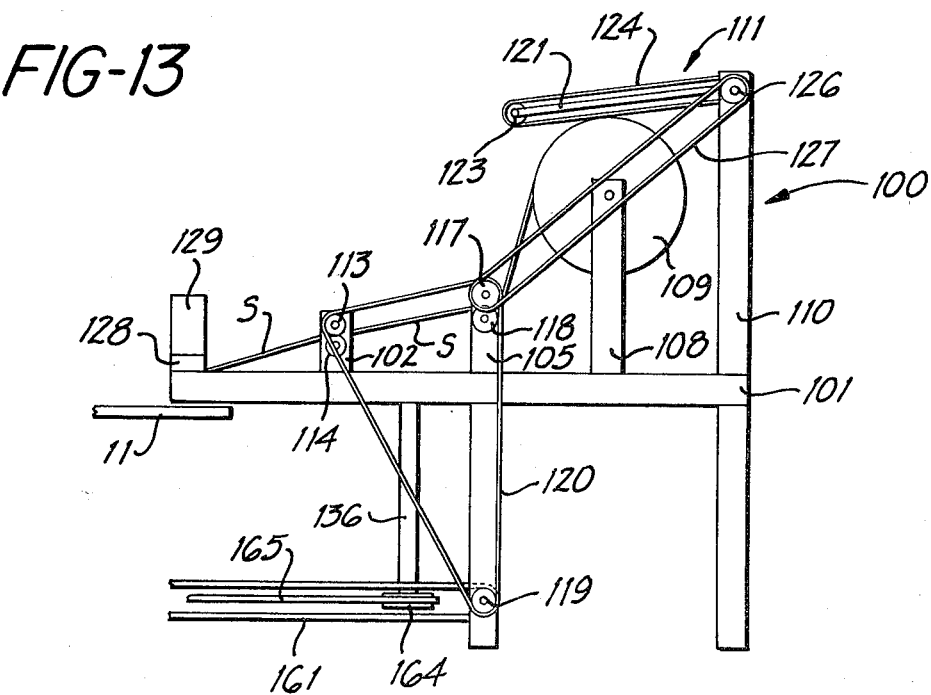
FIG. 13 is a side view of an egg roll dough feeder.
Figure 14:
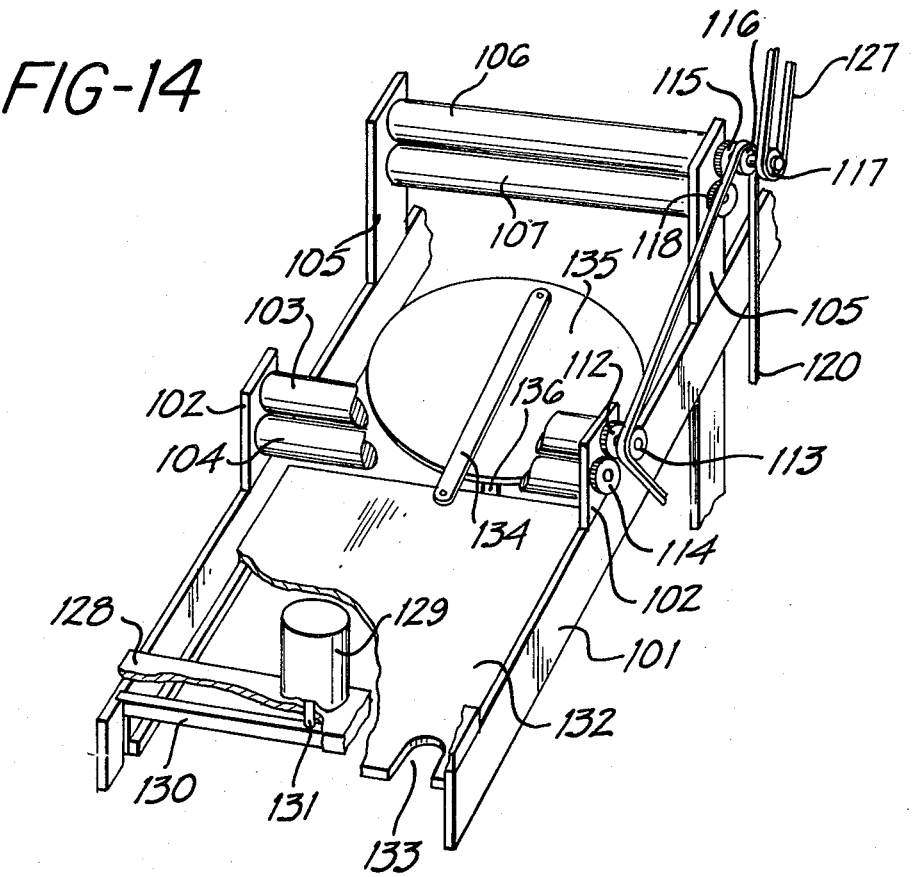
FIG. 14 is a perspective view of a part of the egg roll dough feeder.

FIG. 13 shows a side view of an egg roll dough feeder 100 to feed the egg roll dough s onto the forming assembly 20 at station A. The egg roll dough feeder 100 is provided with a frame 101 including a first stand 102 to support a pair of rollers 103, 104, a second stand 105 to support a pair of rollers 106, 107, a third stand 108 to rotationally support a roll 109 of dough, and a fourth stand 110 to support a feeding belt member 111. As shown in FIG. 14, the roller 103 includes gear 112 and a sprocket 113, and the roller 104 includes a gear 114. The gears 112, 114 engage each other so that when the sprocket 113 is rotated, the rollers 103, 104 are rotated as well. On the other hand, the roller 106 includes a gear 115 and sprockets 116, 117 and the roller 107 includes a gear gear 118. The gears 115, 118 engage each other so that when at least one of the sprockets 116, 117 is rotated, the rollers 106, 107 are rotated. It is to be noted that spaces between the rollers 103 and 104 and between the rollers 106 and 107 can be adjusted for feeding egg roll dough with various thicknesses. The frame 101 is provided with a sprocket 119 on a lower part thereof, and a chain 120 is attached along the sprockets 113, 116, 119 so that when the sprocket 119 is rotated, the rollers 103, 104, 106, 107 are rotated at the same time.

Figure 15:
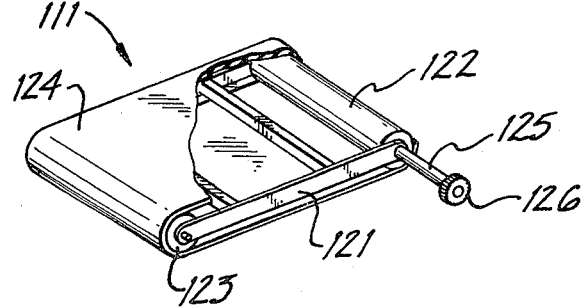
FIG. 15 is a perspective view of a feeding belt member of the egg roll dough feeder, in which a belt is partially cut.

As shown in FIG. 15, the feeding belt member 111 comprises a frame 121, two rollers 122, 123 rotationally connected at longitudinal ends of the frame 121 respectively, and a wide belt 124 situated between the rollers 122, 123. The roller 122 includes a shaft 125 rotationally disposed on the stand 110 by means of bearings (not shown), and a sprocket 126 connected to the shaft 125. Therefore, the feeding belt member 111 can be rotated relative to the stand 110 so that the belt 124 is always located on the roll 109. A chain 127 is situated between the sprockets 117, 126 to rotate the belt 124 at the same time of rotation of the rollers 103, 104, 106, 107.

At a front end of the frame 101, a longitudinal bar 128 is situated. On the bar 128, a pneumatic cylinder 129 is attached, and under the bar 128, a cutter 130 is located, the cutter 130 being connected to a rod 131 of the pneumatic cylinder 129. When the cylinder 129 is operated, the cutter 130 moves downwardly to cut the elongated egg roll dough fed from the roll 109 into each rectangular dough.

Between the stand 102 and the bar 128 on the frame 101, a support plate 132 having a notch 133 at a front end is slidably situated. The length of the support plate 132 is designed to correspond to the length of the egg roll dough s to carry the dough s onto the forming assembly 20 at station A. The support plate 132 is rotationally connected at a rear end thereof to a rod 134 which is rotationally connected to a disc 135. The disc 135 is supported on a shaft 136 for rotation, so that when the disc 135 is rotated, the support plate 132 is reciprocally moved to carry the dough.

Figure 16:
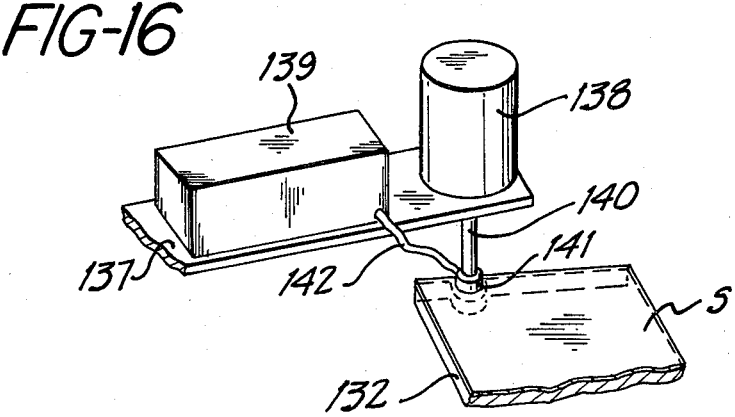
FIG. 16 is a perspective view of a support bar and mechanism to dispose the egg roll dough on a table.

As shown in FIGS. 1, 2, 16, a support bar 137 is located station A, on which a pneumatic cylinder 138 and a container 139 are situated. The cylinder 138 includes a piston rod 140 having a sponge 141 at a front end thereof, and the container 139 includes a flexible hose 142 connected to the sponge 141. Egg yolk is filled in the container 139 to thereby supply the yolk to the sponge 141 through the hose 142. The piston rod 140 of the cylinder 138 is located just above the notch 133 of the support plate 132 when the plate 132 is moved to a forward position. Namely, when the plate 132 with the dough s is moved to the forward position, the cylinder 138 is operated to push the dough s directly on the turntable 11 so that the dough s is located on the forming assembly 20 when the plate 132 carrying the dough to the forward position is returned to a rear position. When the piston rod 140 is operated, the portion pressed by the sponge 141 is coated with the yolk. Therefore, when the egg roll dough s is finally wrapped, the portion with the yolk will stick to the stuffing portion of the egg roll.

Figure 3:
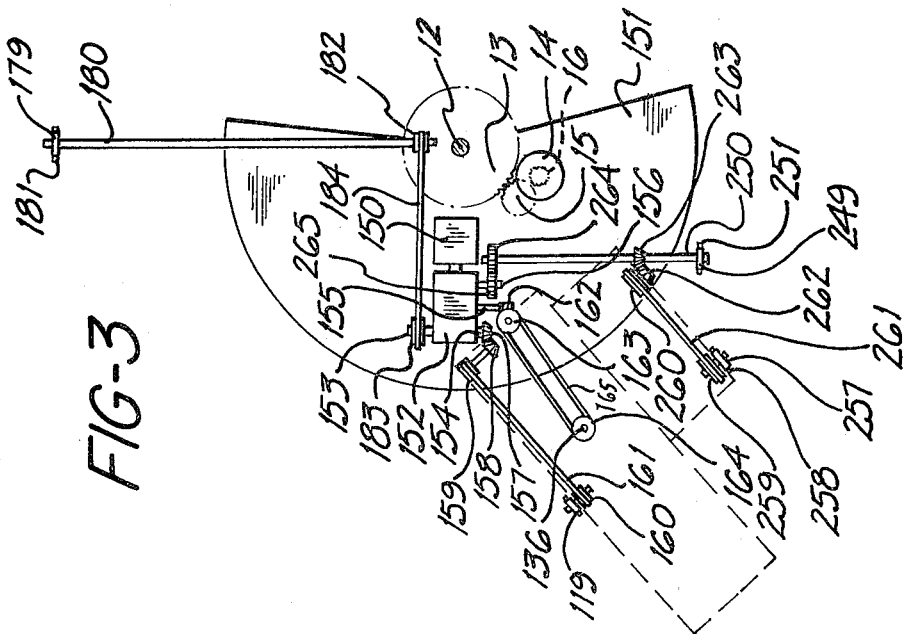
FIG. 3 is an explanatory plan view of a power system of the egg roll making machine.

For an explanation of a power system of the egg roll dough feeder 100, reference is made to FIG. 3. A motor 150 is located on a bottom plate 151 and is connected to a gear box 152. The gear box 152 includes four output shafts 153, 154, 155, 156, the shafts 153, 154 rotating intermittently with long-time intervals, the shaft 155 rotating intermittently with short-time intervals, and the shaft 156 rotating constantly. The shaft 154 is provided with a face gear 157 engaged with a face gear 158 which is connected to a sprocket 159. The sprocket 119 illustrated in FIG. 13 is connected to a sprocket 160, and a chain 161 is situated between the sprockets 159 and 160 so that when the shaft 154 is rotated, the sprocket 119 is rotated as well.

The shaft 155 is provided with a worm gear 162 which is connected to rotate a sprocket 163. The shaft 136 for the disc 135 illustrated in FIGS. 13, 14 includes a sprocket 164 which is connected to the sprocket 163 by means of a chain 165, so that when the shaft 155 is rotated, the disc 135 is rotated to thereby reciprocally move the support plate 132.

As previously set forth, the turntable 11 is rotated intermittently. When one of the forming assemblies 20 on the turntable 11 is transferred from station D and stops at station A, the output shaft 154 of the gear box 152 is turned to rotate the rollers 103, 104, 106, 107 and the belt 124 of the feeding belt member 111. The elongated egg roll dough is led from the roll 109 and is disposed on the support plate 132 passing through the spaces between the rollers 106, 107 and the rollers 103, 104. Therefore, when the outlet shaft 154 is rotated, the elongated egg roll dough of the roll 109 is moved forwardly at a distance to form the rectangular dough when it is cut. At the same time of rotation of the shaft 154, the shaft 155 is rotated to move the support plate 132 forwardly. The rotational speed of the rollers 103, 104, 106, 107 and the belt 124 is the same as the moving speed of the plate 132 so that the elongated egg roll dough supported by the plate 132 is carried on the assembly 20. In this position, the shafts 154, 155 are stopped. Then, the pneumatic cylinder 129 is operated to cut the elongated egg roll dough. After cutting the dough, the shaft 155 is again rotated to move the support plate 132 from the forward position to the rear position. The shaft 155 then stops. When the pneumatic cylinder 129 is operated for cutting, the pneumatic cylinder 138 is also operated to push the dough s with the sponge 141. The sponge 141 pushes the dough s until the support plate 132 returns to the rear position, so that the dough s is surely located on the turntable 11. Finally, the piston rod 140 of the cylinder 138 returns to an upper position. Thereafter, the turntable 11 is rotated to move the dough disposed at station A to station B, and the egg roll dough feeder 100 is operated to put the dough s on the new assembly 20 at station A.

Figure 17:
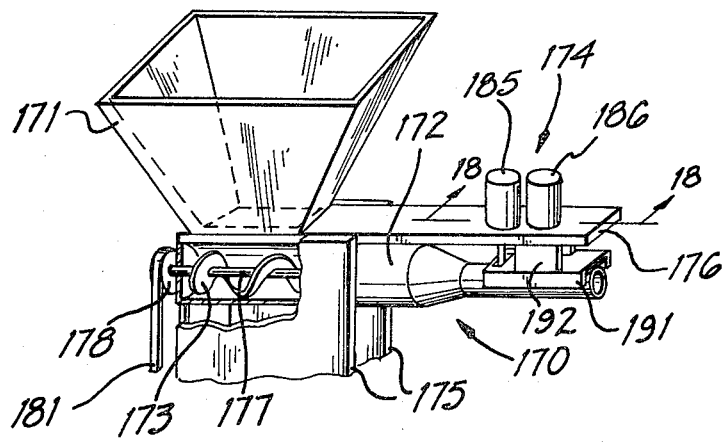
FIG. 17 is a perspective view of an egg roll stuffing supplier.

At station B, an egg roll stuffing supplier 170 is situated to put the stuffing t on the dough s disposed on the assembly 20 at station A, i.e. the stuffing t is forcibly pushed down to be located together with the dough s into the depression 24 of the mold 22. The stuffing supplier 170, as shown in FIGS. 1, 2, and 17 as a whole, comprises a hopper 171, a food injector 172 having a screw conveyor 173 therein, and a distributing member 174 for placing the stuffing onto the dough s. The hopper 171 and the food injector 172 are supported by a pair of side plates 175, and the distributing member 174 is situated on a plate 176 connected to the side plate 175. The screw conveyor 173 of the food injector 172 has a shaft 177 on which a sprocket 178 is attached. The sprocket 178 is connected to a sprocket 179 on a shaft 180 by means of a chain 181 (FIG. 3). The shaft 180 includes a sprocket 182 which is also connected to a sprocket 183 on the shaft 153 of the gear box 152 by means of a chain 184. The shaft 153 rotates at the same time interval as the shaft 154 to thereby intermittently rotate the shaft 177 of the screw conveyor 173. The food stuffing t is filled in the hopper 171, so that when the screw conveyor 173 is rotated, the food stuffing t in the hopper 171 is transmitted through the food injector 172 toward the distributing member 174.

The distributing member 174 includes pneumatic cylinders 185, 186 with piston rods 187, 188 respectively, the piston rod 187 of the cylinder 185 having a cutter 189 at one end and the piston rod 188 of the cylinder 186 having a pushing plate 190. The pneumatic cylinders 185, 186 are attached to the plate 176 to which a supporting block 191 is connected by means of a pair of side plates 192, 193. The supporting block 191 includes an elongated slit 194 and a cylindrical hollow flange 195 at an upper portion thereof. The cutter 189 is disposed in the slit 194 to be reciprocally moved up and down for cutting the stuffing t to appropriate length. A supplemental plate 196 having a cylindrical hollow flange 197 is situated beneath the block 191 such that the flange 197 is disposed in the flange 195. The flange 197 is longer than the flange 195 and is provided with a stopper ring 198 at an upper end thereof. Therefore, the supplemental plate 196 can be slightly moved up and down relative to the block 191. The piston rod 188 passes through the flange 197 and is connected to the pushing plate 190.

The pushing plate 190 constitutes together with two side sections 199 a cylindrical compartment 200 which is located in front of the food injector 172 and above the depression 24 of the mold 22. Each side section 199 includes two projections 201 extending outwardly therefrom, which are rotationally connected to members 202 of the supporting block 191 so that the side sections 199 can be respectively rotated outwardly relative to the block 191. The pushing plate 190 includes longitudinal edges 203 which are partly cut at outer portions thereof, while each side section 199 includes an edge 204 which are partly cut at an inner portion to engage with the edge 203 of the pushing plate 190.

The piston rod 188 is provided with an elongated hole 205 therein in which a spring plate 205 and a pushing rod 207 are situated. The spring plate 206 is immovably disposed in the hole 205, while the pushing rod 207 including upper and lower ends 208, 209 respectively are rotationally disposed by means of a shaft 210. The upper end 208 of the pushing rod 207 are generally pushed outwardly by the spring plate 206, but when the piston rod 188 is pushed downwardly, the upper end 208 is contacted with a block 211 of the side plate 192 to move back into the hole 205 against the force of the spring plate 206. Operation of these members will be explained in detail hereinafter.

As already explained, the shaft 153 of the gear box 152 rotates together with the shaft 154, so that the screw conveyor 173 is operated after the egg roll dough s on the assembly 20 is stopped at station B. When the screw conveyor 173 is rotated, the stuffing t in the hopper 171 is transferred forwardly in the food injector 172 to thereby convey the stuffing into the compartment 200. In this condition, the screw conveyor 173 stops, and then the pneumatic cylinder 185 is operated to move the piston rod 187 downwardly. Consequently, the cutter 189 connected to the piston rod 187 is actuated to thereby cut the stuffing t. After cutting the stuffing, the cutter 189 immediately returns to an upper position.

Then, the pneumatic cylinder 186 is operated to put the stuffing t in the compartment 200 into the depression 24 of the mold 22. At this time, the egg roll dough s disposed on the assembly 20 is pushed into the mold 22 together with the stuffing t.

As shown in FIG. 21, when the stuffing t is disposed in the compartment 200, the piston rod 188 of the pneumatic cylinder 186 is located in an upper position. When the pneumatic cylinder 186 is operated, the piston rod 188 is gradually moved downwardly. Consequently, the lower end 209 of the pushing rod 207 is contacted with an upper end of the cylindrical flange 197 of the supplemental plate 196 to push the plate 196 downwardly together with the pushing plate 190. Movement of the supplemental plate 196 stops when the stopper ring 198 contacts the flange 195 of the supporting block 191 (FIG. 22). In this procedure, at first the pushing plate 190 is slightly moved downwardly, so that the edges 203 of the plate 190 disengage the edges 204 of the side sections 199. Then, the edges 204 are pushed downwardly by means of the supplemental plate 196. Therefore, the side sections 199 are rotated relative to the projections 201 to thereby open the lower portion of the side sections 199.

Slightly before stopping of the downward movement of the plate 196, the upper end 208 of the pushing rod 207 contacts the block 211 attached to the side plate 192 to urge the rod 207 inside the hole 205 of the piston rod 188 in spite of the force of the spring plate 206. Therefore, as soon as the plate 196 reaches the lower position, the lower end 209 is moved into the hole 205 due to the contact of the upper end 208 with the block 211. Consequently, the piston rod 188 can be further pushed downwardly through the flange 197 to locate the egg roll dough s and the stuffing t in the depression 24 (FIG. 23).

After placing the stuffing t into the depression 24, the piston rod 188 is returned to the upper position. In returning to the upper position, the pushing plate 190 contacts the edges 204 of the side sections 199 and the supplemental plate 196, so that the side sections 199 are rotated inwardly and the plate 196 is moved back to the first position as shown in FIG. 21. The rod 207 is also pushed outwardly from the hole 205 by the spring plate 206. After placing the stuffing into the depression, the turntable 11 is moved to thereby transfer the new dough to station B.

Under the turntable 11, there is provided a fan-shaped middle plate 215 which extends from a position between stations B and C to a position right after station D. The middle plate 215 supports thereon vertical cams 216, 217, 218 to actuate the inner, outer and middle folding plates 50, 51, 52 respectively and horizontal cams 219, 220 to actuate the hooks 53, 54 respectively.

Figure 25:
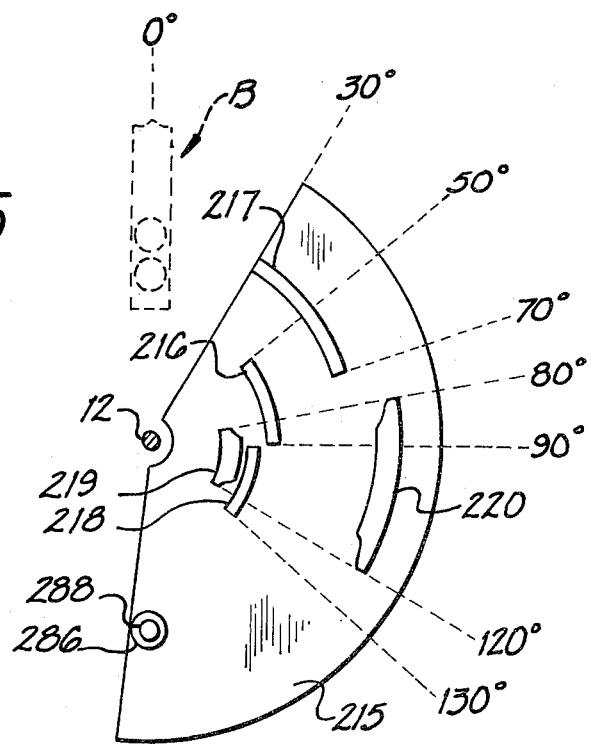
FIG. 25 is an explanatory plan view of the actuating means.
Figure 26:
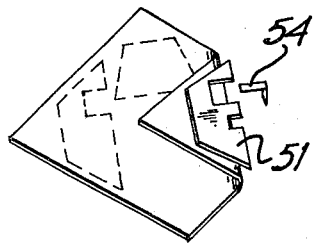
FIGS. 26-30 are explanatory perspective views to show movement of the folding plates and the egg roll dough folded by the plates.
Figure 27:
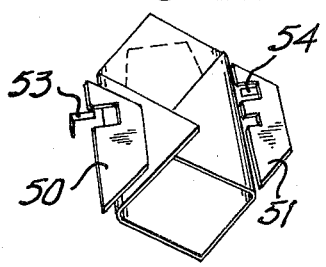

Assuming that the vertical shaft 12 is a center and station B is located in a 0 degree line as shown in FIG. 25, the vertical cams 216, 217 are located between 50° and 90°, and 30° and 70° respectively. Namely, at first the roller 78 of the rack 75 contacts the cam 217 to thereby raise the rack 75 upwardly, so that the outer plate 51 is rotated onto the depression 24 to fold the outer side portion of the egg roll dough. After the outer plate 51 is fully rotated (at 50°, FIG. 26), the outer plate 51 returns to the first position (FIG. 27). When the outer plate 51 is fully turned (at 50°), the roller 67 of the rack 64 contacts the cam 216 to start rotation of the inner plate 50 for folding the inner side portion of the egg roll dough. At the position where the outer plate 51 returns to the first position (at 70°), the inner plate 50 is fully turned (FIG. 27). At 90° (station C), the inner plate 50 returns to the first position (FIG. 28).

Figure 29:
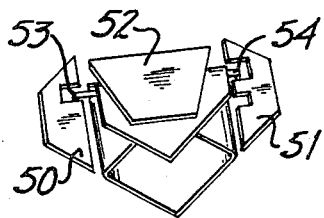
Figure 30:
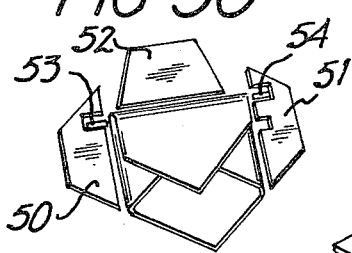
Figure 31:
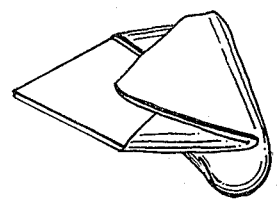
FIG. 31 is a perspective view of the egg roll dough after being folded by the folding plates.
Figure 34:
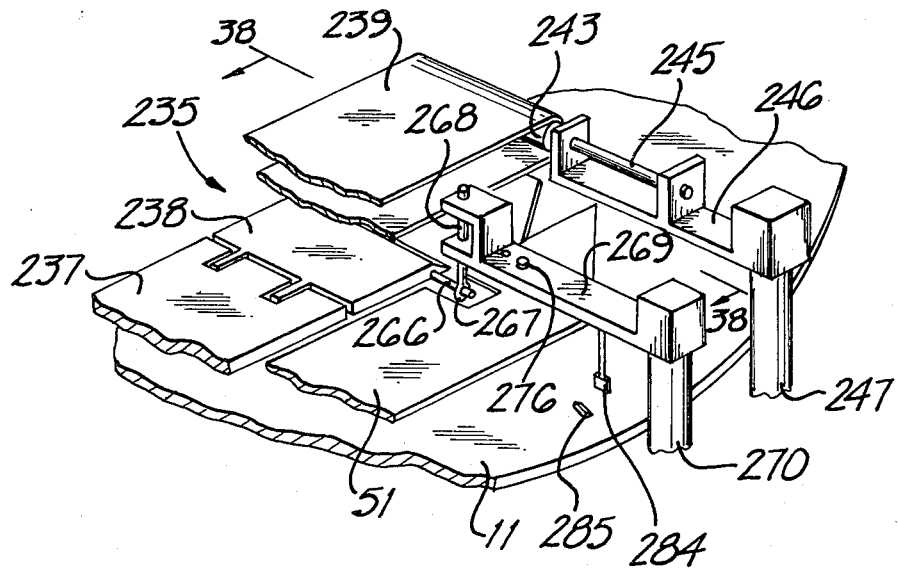
FIG. 34 is a perspective view of a part of the wrapping means.
Figure 37:
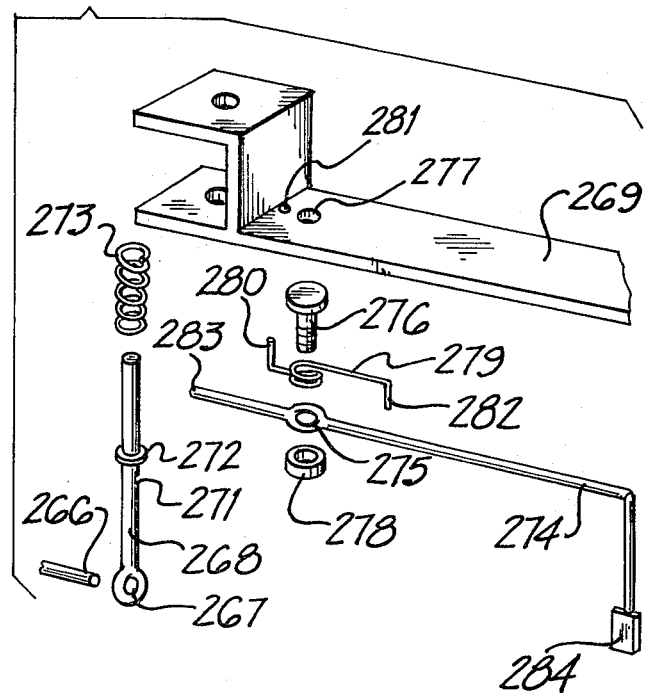
FIG. 37 is an exploded view of a part of the wrapping means.
Figure 35:
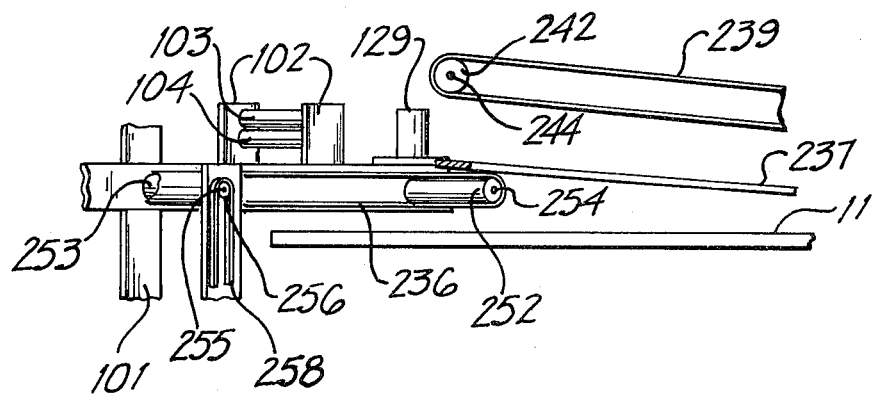
FIG. 35 is a side view of the remaining part of the wrapping means shown in FIG. 34.
Figure 36:
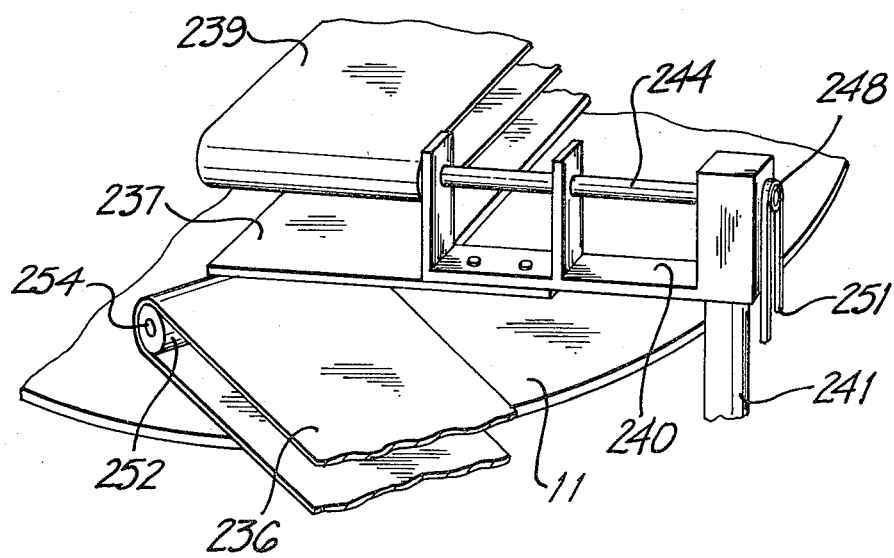
FIG. 36 is a perspective view of the wrapping means as shown in FIG. 35, in which the frame is removed therefrom.
Figure 38:
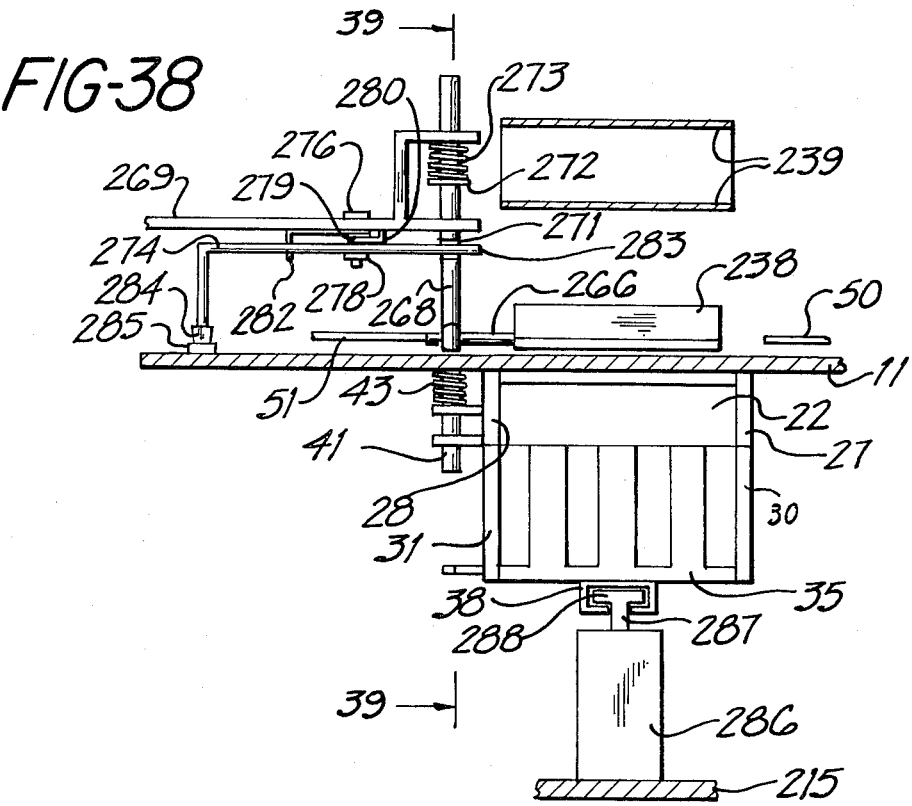
FIG. 38 is a section view taken along line 38—38 in FIG. 34.

At 80°, the rollers 88 of the hooks 53, 54 contact the horizontal cams 219, 220 respectively to move the hooks 53, 54 onto the edges of the folded egg roll dough. Therefore, the edges are held by the hooks 53, 54 at 90° (FIG. 28, station C). As explained later, an egg yolk is in this position applied on the dough between the hooks 53, 54 to tightly stick the rear side portion of the dough when folded onto the stuffing portion. At station C (90°), the turntable 11 stops, but as soon as the turntable 11 rotates, the roller 84 of the rack 82 contacts the vertical cam 218 to turn the middle plate 52. FIG. 29 shows that the middle plate 52 is fully turned. Thereafter, the hooks 53, 54 return to the first position (at 120°) and the middle plate 52 also returns to the first position (at 130°, FIG. 30). FIG. 31 shows the egg roll partly folded by the folding plate 50, 51, 52. In this condition, the egg roll is transferred to station D.

As already stated, a moisturizer 225 is situated at station C. As shown in FIGS. 32, 33, a support bar 226 is located above station C, on which a pneumatic cylinder 227 and a container 228 are attached. The pneumatic cylinder 227 includes a piston rod 229, at a front end of which a hollow bar 230 having a plurality of small holes 231 is provided. A sponge 232 is connected to the bar 230, and a hose 233 is provided between the bar 230 and the container 228. The container 228 is filled with egg yolk, so that the egg yolk flows into the sponge 232 through the hose 233 and the bar 230 to thereby always moisturize the same.

Figure 28:
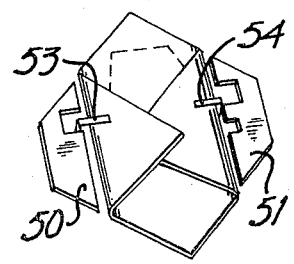

When the assembly 20 on the turntable 11 is stopped at station C, the inner and outer side portions of the egg roll dough s is folded by the inner and outer folding plates 50, 51 and the folded edges thereof are held by the hooks 53, 54 as shown in FIG. 28. In this condition, the pneumatic cylinder 227 is actuated to move the piston rod 229 downwardly. Consequently, the sponge 232 contacts the egg roll dough between the hooks 53, 54 to moisturize the area by the egg yolk. Then, the piston rod 229 returns to the first position, and when the next assembly 20 stops at station C, the pneumatic cylinder 227 again operates.

Since the part of the egg roll dough is moisturized and then the rear portion of the dough is folded by the middle plate 52 as shown in FIG. 29, the folded portions are tightly stuck together even after the middle plate 52 returns to the first position. Therefore, the egg roll can be tightly wrapped at station D.

At station D, there is provided a wrapping device 235 for tightly wrapping the partly folded egg roll dough s to a cylindrical form, the wrapped egg roll being thereafter transferred by a conveyor 236 connected to the frame 101 of the egg roll dough feeder 100. The wrapping device 235 includes a bottom plate 237 having a flap 238 rotationally connected at a front end thereof, and a wrapping belt member 239 located above the bottom plate 237 so that the egg roll can be rolled therebetween.

As shown in FIGS. 1, 2, 34–36, the support plate 237 is connected to an arm 240 of a supporting shaft 241. The support plate 237 is inclined relative to the horizontal turntable 11 such that an end of the plate 237 attached to the arm 240 is higher than the opposite end of the plate 237. Therefore, the conveyor 236 can be situated below the plate 237. The belt member 239 is disposed between rollers 242, 243 having shafts 244, 245 respectively. The shaft 244 of the roller 242 is rotationally situated on the arm 240, while the shaft 245 of the roller 243 is rotationally disposed on an arm 246 of a supporting shaft 247. The shaft 244 of the roller 242 is provided with a sprocket 248 which is engaged with a sprocket 249 connected to a shaft 250 by means of a chain 251, so that when the shaft 250 is rotated, the shaft 244 rotates to thereby turn the belt member 239.

The conveyor 236 is situated between two rollers 252, 253 having shafts 254, 255 respectively, the shafts 254, 255 being rotationally connected to the frame 101. The shaft 255 is provided with a sprocket 256 which is connected to a sprocket 257 by means of a chain 258. As shown in FIG. 3, the sprocket 257 is coaxially connected to a sprocket 259 engaging a sprocket 260 by means of a chain 261. The sprocket 260 includes a face gear 262 which engages a face gear 263 situated on the shaft 250. Therefore, when the shaft 250 rotates, the conveyor 236 rotates as well. The shaft 250 is provided with a ger 264 which engages a gear 265 disposed on the shaft 156 of the gear box 152. As already stated, the shaft 156 rotates constantly, and therefore the conveyor 236 and the belt member 239 rotates without time interval.

The flap 238 rotationally connected to the support plate 237 includes a rod 266 extending outwardly therefrom. The rod 266 is inserted into a loop 267 of a control rod 268 vertically situated in an arm 269 of a supporting shaft 270, so that the position of the flap 238 is regulated by the control rod 268. The control rod 268 is provided with a notch 271 and a stopper 272 on which a spring 273 is situated to urge the rod 268 downwardly. An L-shape bar 274 having a loop 275 therein is rotationally attached beneath the arm 269. Namely, a bolt 276 passing through a hole 277 of the arm 269 is inserted into the loop 275 of the bar 274 and is tightened by a nut 278. A spring 279 is located on the bolt 276 such that an end 280 of the spring 279 is inserted into a hole 281 of the arm 269 and another end 282 of the spring 279 is located on the bar 274 to urge an end 283 of the bar 274 onto the rod 268. Accordingly, when the end 283 of the bar 274 engages the notch 271, the control rod 268 stays in the position. However, if the bar 274 disengages the notch 271, the bar 274 is pushed down by the spring 273.

The bar 274 includes a flexible plate 284 at a lower end thereof, while the turntable 11 includes four projections 285 extending upwardly therefrom. The projections 285 are located outside the respective outer plates 51 of the assemblies 20 so that before each assembly 20 stops at station D, the projection 285 contacts the plate 284 to disengage the end 283 with the notch 271.

Referring to FIGS. 1, 24, 38–40, a pneumatic cylinder 286 having a piston rod 287 is situated on the middle plate 215. The piston rod 287 includes an upper end 288 which can be engaged with the guide 38 attached to the bottom portion of the pushing block 35 when the assembly 20 turns and stops at station D. The cylinder 280 is in this position operated to lift up the pushing block 35 so that the cylindrical portion of the egg roll in the depression 24 is brought upwardly for final wrapping.

As already explained, after the stuffing t is put on the egg roll dough s at station B, the dough s is gradually folded by the folding plates 50, 51, 52. Therefore, when the dough s on the assembly 20 is carried to station D, the dough s is folded or wrapped as shown in FIG. 31, where the cylindrical portion of the egg roll is located in the depression 24 of the mold 22.

When the turntable 11 rotates and stops at station D, at first the projection 285 on the turntable 11 contacts the flexible plate 284 to push the end 283 of the bar 274 outwardly so that the end 283 disengages the notch 271 of the control rod 268. Consequently, the rod 268 is pushed down by the spring 273, and therefore the flap 238 which was aligned parallel to the belt member 239 is rotated relative to the support plate 237 to thereby locate a front end of the flap 238 on the egg roll dough s. Since the plate 284 is flexible, soon after the projection 285 pushes the plate 284 to disengage the end 283 of the bar 274 with the notch 271, the plate 284 slips out of the projection 285 and returns to the first position. Then, the turntable 11 stops in position at station D.

Figure 39:
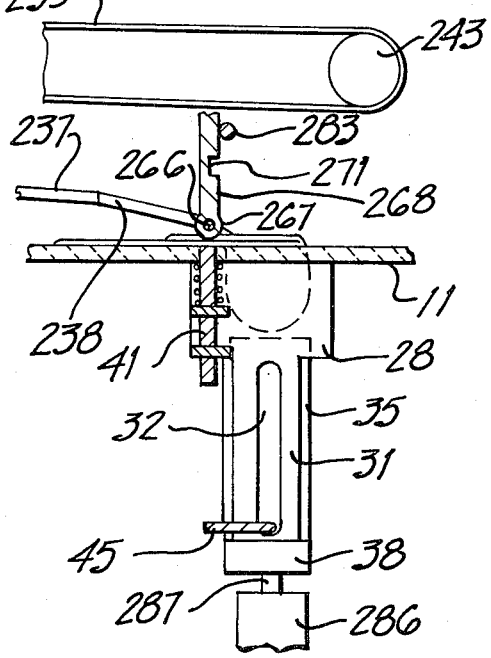
FIG. 39 is a section view taken along line 39—39 in FIG. 38.

When the turntable 11 stops, a front edge of the flap 238 is located on the dough s at an edge of the depression 24 as shown in FIG. 39, and also the upper end 288 of the piston rod 287 is situated in the guide 38 of the pushing block 35.

Figure 40:
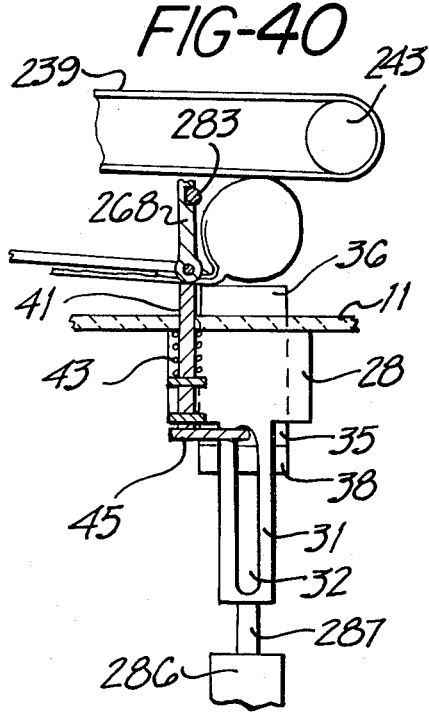
FIG. 40 is a section view similar to FIG. 39, in which a pushing block is moved upwardly for final wrapping of the egg roll.

Thereafter, the pneumatic cylinder 286 is operated to push up the pushing block 35 to an uppermost position, so that the pushing heads 36 located in the rectangular holes 37 of the mold 22 move up in the depression 24 to thereby elevate the cylindrical portion of the egg roll. When the pushing block 35 is lifted up, the plate 45 attached to the pushing block 35 also moves upwardly. Therefore, after the plate 45 moves at a certain distance, the plate 45 contacts a lower end of the rod 41 and lifts the rod 41 upwardly. Since the rod 41 is located beneath the control rod 268, when the rod 41 is moved up, the control rod 268 is pushed upwardly to thereby raise the flap 238 to a first position parallel to the belt member 239. Accordingly, when the pushing block 35 is moved to the uppermost position, the control rod 268 and the flap 238 are lifted up, and the notch 271 of the rod 268 is engaged with the end 283 of the bar 274 to leave them in the upper position. In this position, the cylindrical portion of the egg roll contacts the belt member 239 as shown in FIG. 40. Since the belt member 239 rotates constantly, as soon as the cylindrical portion of the egg roll contacts the belt member 239, the cylindrical portion is rolled. However, since the free end of the egg roll dough s is located beneath the flap 238, tension is applied to the free end of the dough s while the cylindrical portion is rolled. Therefore, the egg roll can be tightly wrapped. The egg roll is rolled and transferred forwardly by the belt member 239. Thereafter, the egg roll is transmitted onto the conveyor 236 and is carried for further treatment.

After the cylindrical portion of the egg roll is wrapped, the pneumatic cylinder 286 is again operated to move back the pushing block to the bottom position. Since the end 283 of the bar 274 engages the recess 271 of the rod 268, the flap 238 remains in the upper position. Then, the turntable 11 is rotated to move the assembly 20 at station D to station A for supplying the new egg roll dough thereon, and the same procedure is repeated. Therefore, the egg rolls can be continuously made in accordance with the egg roll making machine 10 of the present invention.

While the invention has been described with reference to the specific embodiment, it is to be noted that the description is illustrative and the invention is limited only by the appended claims.

What is claimed is:

1. Apparatus for automatically making egg rolls comprising:
   intermittently moving rotary table transmitting means;
   a plurality of forming assemblies on the transmitting means, each forming assembly comprising folding means for folding three side portions of an egg roll dough and mold means for receiving a part of the egg roll stuffing therein;
   feeding means for feeding the egg roll dough successively on each forming assembly;
   supply means for supplying the egg roll stuffing on the egg roll dough, said supplying means preparing the necessary amount of the stuffing to be disposed in one egg roll product and putting the stuffing into the mold means to deposit the stuffing and a part of the egg roll dough therein;
   actuating means for actuating the folding means of said forming assembly to fold three side portions of the egg roll dough over the stuffing in the mold means to thereby form a partially folded egg roll; and
   wrapping means for wrapping the partially folded egg roll to form a cylindrical product, said means for wrapping including means for pushing up the partially folded egg roll from the mold, means for turning the partially folded egg roll for wrapping the remaining side portion of the egg roll thereon and means for transferring the wrapped product.

2. Apparatus according to claim 1, in which said supplying means comprises a hopper containing food stuffing therein, a food injector having a screw conveyor, and a distributing member to place the food stuffing supplied from said hopper by means of said screw conveyor onto said egg roll dough.

3. Apparatus according to claim 2, in which said distributing member comprises a collapsible compartment located in front of said food injector, a stuffing cutter to cut the stuffing along a rear end of said compartment, and an arranging member to collapse the compartment and put the stuffing in the compartment onto the egg roll dough.

4. Apparatus according to claim 1, in which said feeding means comprises a dough feeder for withdrawing a roll of the elongated egg roll dough at a predetermined length, and a dough cutter for cutting the elongated dough withdrawn from the roll to form a rectangular sheet of the egg roll dough.

5. Apparatus according to claim 4, in which said feeding means further comprises a reciprocally moving support plate to locate the elongated dough onto said forming assembly, and a disposing member to hold the rectangular dough cut by said dough cutter on said forming assembly when the support plate returns to a retracted position.

6. Apparatus according to claim 5, in which said disposing member includes a first cylinder with a first piston and a first liquid supplier attached to said first piston so that when the first cylinder is actuated to move said first piston onto the egg roll dough, the egg roll dough is held on said forming assembly and is moisturized by said first liquid supplier to adhere that portion onto a cylindrical portion of the egg roll at the time of wrapping.

7. Apparatus according to claim 1, in which said transmitting means comprises a plurality of openings, and said mold means of the forming assembly comprises a body attached beneath the opening of said transmitting means, said body having a depression to receive therein a part of the egg roll dough and the egg roll stuffing through said opening, and a pushing block to lift the stuffing portion in the depression above the opening of said transmitting means.

8. Apparatus according to claim 7, in which said wrapping means comprises a lifting member to move the pushing block of the mold means up and down, a belt member above said transmitting means, and a bottom plate below said belt member, whereby when said pushing block is lifted up, an upper side of the stuffing portion is contacted with said belt member and the unfolded front side portion of the egg roll dough is located below said bottom plate to thereby apply tension to the egg roll stuffing portion while the stuffing portion is finally wrapped.

9. Apparatus according to claim 8, in which said wrapping means further comprises a flap rotationally connected at a front end of said bottom plate and a flap control member to move the flap such that when the folded egg roll is carried to a position for final wrapping, said flap is located on the unfolded front side portion of the egg roll dough, and then the flap is lifted up together with the stuffing portion of the egg roll by the lifting member to thereby tightly wrap the egg roll.

10. Apparatus according to claim 7, in which said folding means of the forming assembly comprises inner, middle and outer folding plates rotationally situated on said transmitting means to surround the opening at three sides, and operation members for each folding plate, each operation member having a gear attached to an axis of the folding plate and a rack engaging with said gear, so that when said racks of the operation members are moved up and down, the folding plates rotate to fold three side portions of the egg roll dough over the stuffing portion.

11. Apparatus according to claim 10 further comprising a moisturizer including a second cylinder with a second piston and a second liquid supplier attached to said second piston, said moisturizer being actuated after the inner and outer folding plates are operated to moisturize a rear portion of the egg roll dough by the liquid in the second liquid supplier for attaching the rear portion to a front portion of the egg roll when the rear portion is folded by the middle folding plate.

12. Apparatus according to claim 11, in which said folding means further comprises a pair of holding members attached perpendicular to the inner and outer folding plates, said holding members having hooks respectively to be disposed on inner and outer edges of the egg roll dough folded by the inner and outer folding plates so that the rear portion of the egg roll dough can be properly folded by the middle folding plate.

13. Apparatus according to claim 12, in which said actuating means of the folding means comprises three vertical cam members for moving the respective racks up and down to actuate the folding plates independently, and two horizontal cam members for moving the hooks of the holding members toward the opening of said transmitting means, said vertical and horizontal cam members being located below said transmitting means such that after the inner and outer folding plates are operated in staggered relationship to fold the inner and outer side portions of the egg roll dough, the hooks of the holding members are moved onto the inner and outer edges of the egg roll dough and then the middle folding plate is actuated to fold the rear portion of the egg roll dough.

* * * * *